US008902083B2

(12) United States Patent
Riedel et al.

(10) Patent No.: US 8,902,083 B2
(45) Date of Patent: Dec. 2, 2014

(54) METHOD AND DEVICE FOR PRESENTING INFORMATION BY AN AUTOSTEREOSCOPIC 3D DISPLAY IN A PASSENGER CABIN OF AN AIRCRAFT OR SPACECRAFT

(75) Inventors: Christian Riedel, Bliedersdorf (DE); Stefan Mahn, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 49 days.

(21) Appl. No.: 13/491,276

(22) Filed: Jun. 7, 2012

(65) Prior Publication Data
US 2012/0319870 A1    Dec. 20, 2012

Related U.S. Application Data

(60) Provisional application No. 61/495,492, filed on Jun. 10, 2011.

(30) Foreign Application Priority Data

Jun. 10, 2011  (DE) .................. 10 2011 077 421

(51) Int. Cl.
*B64D 11/00* (2006.01)
*G09F 21/06* (2006.01)
*G09F 19/14* (2006.01)
*G02B 27/22* (2006.01)

(52) U.S. Cl.
CPC ............ *G09F 21/06* (2013.01); *B64D 11/0015* (2013.01); *Y02T 50/46* (2013.01); *G02B 27/225* (2013.01); *G09F 19/14* (2013.01)
USPC .......................................... 340/945; 345/419

(58) Field of Classification Search
CPC ............................ B64D 45/0015; G06T 19/00
USPC ................... 348/208.5; 345/419; 315/15; 361/679.27; 244/118.5; 385/16, 11
See application file for complete search history.

(56) References Cited

U.S. PATENT DOCUMENTS 5,145,128 A * 9/1992 Umeda ....................... 244/118.5
5,707,028 A   1/1998 Roeper
(Continued)

FOREIGN PATENT DOCUMENTS

DE          10359403      7/2005
DE        202005015696    2/2006
(Continued)

OTHER PUBLICATIONS

German Office Action for Application Serial No. DE 10 2011 077 345.2 dated Oct. 25, 2011.

(Continued)

*Primary Examiner* — Steven Lim
*Assistant Examiner* — Kaleria Knox
(74) *Attorney, Agent, or Firm* — Jenkins, Wilson, Taylor & Hunt, P.A.

(57) ABSTRACT

A method for presenting information by means of an autostereoscopic 3D-display in a passenger cabin of an aircraft or spacecraft, comprising the following steps: provision of the autostereoscopic 3D-display in a predetermined portion of the passenger cabin; provision of a first item of information by means of the autostereoscopic 3D-display such that this information can be detected from a first seat in the passenger cabin; simultaneous provision of a second item of information, which is different from the first item of information, by the autostereoscopic 3D-display such that this second item of information can be detected from a second seat in the passenger cabin. A display device for implementing a method of this type. A passenger cabin for an aircraft or spacecraft comprises a display device of this type. An aircraft or spacecraft having a display device of this type or having a passenger cabin of this type.

7 Claims, 5 Drawing Sheets

(56) References Cited

U.S. PATENT DOCUMENTS

| | | |
|---|---|---|
| 6,104,347 A | 8/2000 | Snygg et al. |
| 7,102,497 B2 | 9/2006 | Nakano et al. |
| 7,414,831 B1 * | 8/2008 | Brown et al. ............ 361/679.27 |
| 7,643,063 B2 * | 1/2010 | Trescott ..................... 348/208.5 |
| 7,843,449 B2 * | 11/2010 | Krah ............................ 345/419 |
| 8,300,161 B2 | 10/2012 | Louwsma et al. |
| 8,362,114 B2 | 1/2013 | Maljkovic et al. |
| 2005/0001787 A1 | 1/2005 | Montgomery et al. |
| 2006/0146046 A1 | 7/2006 | Longhurst et al. |
| 2007/0018585 A1 * | 1/2007 | Ijzerman et al. ................ 315/15 |
| 2008/0158500 A1 | 7/2008 | Kawata et al. |
| 2008/0181301 A1 | 7/2008 | Kim |
| 2011/0029998 A1 | 2/2011 | Yip |
| 2012/0313794 A1 | 12/2012 | Riedel et al. |
| 2012/0320508 A1 | 12/2012 | Riedel et al. |

FOREIGN PATENT DOCUMENTS

| | | |
|---|---|---|
| DE | 112008001451 | 4/2010 |
| DE | 112008001457 | 4/2010 |
| EP | 1804233 | 7/2007 |
| WO | WO 2006 015562 | 2/2006 |

OTHER PUBLICATIONS

German Office Action for Application Serial No. DE 10 2011 077 421.1 dated Oct. 27, 2011.

German Office Action for Application Serial No. DE 10 2011 077 345.2 dated Oct. 28, 2011.

Non-Final Office Action for U.S. Appl. No. 13/492,486 dated Sep. 25, 2013.

Restricition Requirement for U.S. Appl. No. 13/491,265 dated Oct. 1, 2013.

Non-Final Office Action for U.S. Appl. No. 13/491,265 dated Jan. 16, 2014.

Final Office Action for U.S. Appl. No. 13/492,486 dated Mar. 7, 2014.

Notice of Allowance for U.S. Appl. No. 13/492,486 dated Jul. 18, 2014.

Final Office Action for U.S. Appl. No. 13/491,265 dated Aug. 11, 2014.

* cited by examiner

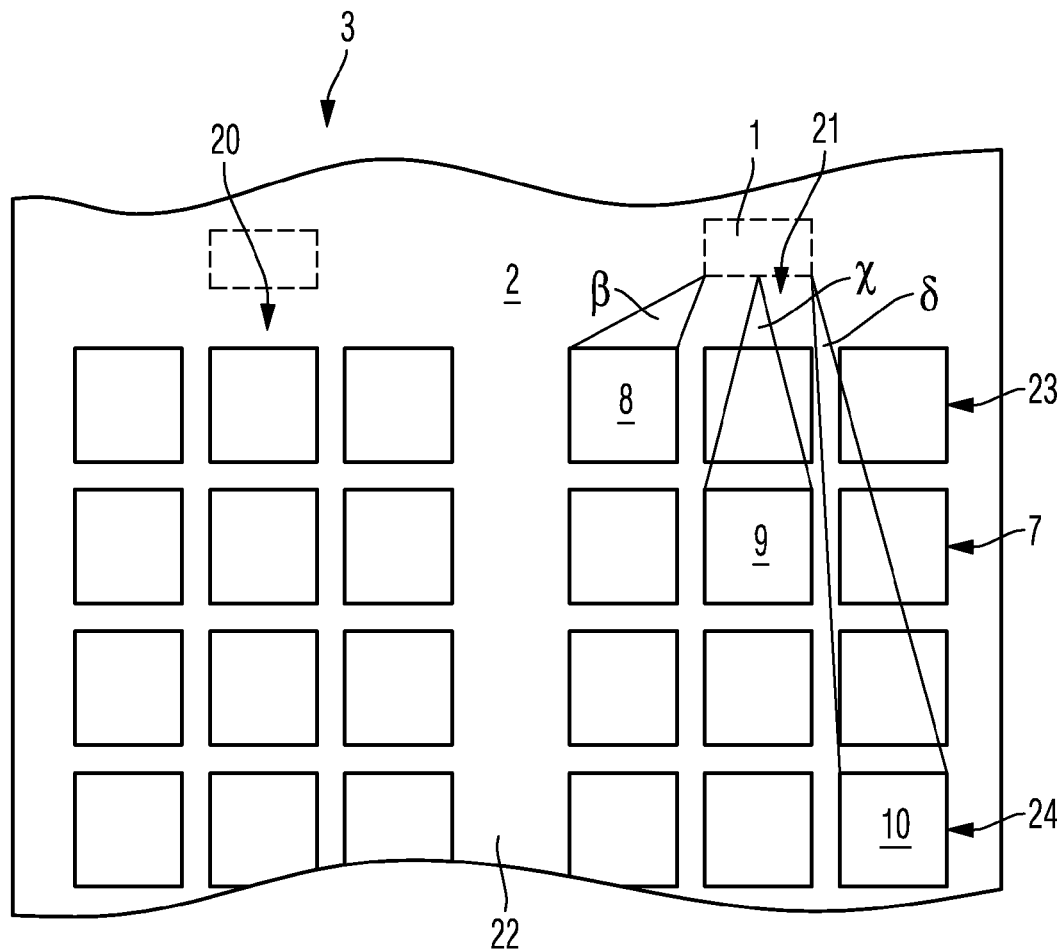
Fig. 4
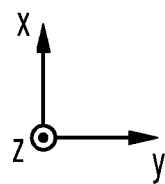

METHOD AND DEVICE FOR PRESENTING INFORMATION BY AN AUTOSTEREOSCOPIC 3D DISPLAY IN A PASSENGER CABIN OF AN AIRCRAFT OR SPACECRAFT

CROSS-REFERENCE TO RELATED APPLICATIONS

This application claims the benefit of and priority to U.S. Provisional Application No. 61/495,492, filed Jun. 10, 2011 and German Patent Application No. 10 2011 077 421.1, filed Jun. 10, 2011, the entire disclosures of which are herein incorporated by reference.

FIELD OF THE INVENTION

The present invention relates to a method for presenting information by means of an autostereoscopic 3D display in a passenger cabin of an aircraft or spacecraft, to a display device for presenting information in a passenger cabin of an aircraft or spacecraft, to a passenger cabin for an aircraft or spacecraft having a display device of this type and to an aircraft or spacecraft having a display device of this type or having a passenger cabin of this type.

Although the present invention can be applied to any aircraft or spacecraft, it will be described in detail by way of example on the basis of an aircraft.

In aircraft construction, retractable displays are often used in so-called in-flight entertainment (IFE) systems. Retractable displays of this type are mounted, for example in an overhead area of a passenger cabin. To watch video information presented by the display, the crew open the displays centrally. A retractable display of this type is described, for example in DE 11 2008 001 451 T5. With this type of display, only one item of video information can ever be presented per display. In this respect, the passenger cabin of the aircraft is generally divided into a plurality of different zones, such as economy class and business class, to which the individual displays are respectively allocated. A direct addressing of individual passengers by means of a video on demand (VOD) system is not possible. Therefore, on long haul flights, to realise a VOD system, an individual display is built into the seats for each individual passenger. However, this solution is not attractive for short haul aircraft due to the cost and weight. Furthermore, the integration of the displays into the seats increases the complexity and the susceptibility to malfunction of the seat construction. Understandably, this is to be avoided.

SUMMARY OF THE INVENTION

It is therefore the object of the present invention to provide a method and a display device which make it possible to simultaneously provide several passengers with different items of information.

According thereto, a method for presenting information by means of an autostereoscopic 3D display in a passenger cabin of an aircraft or spacecraft is provided which has the following steps: provision of the autostereoscopic 3D display in a predetermined portion of the passenger cabin; provision of a first item of information by means of the autostereoscopic 3D display such that this information can be detected from a first seat in the passenger cabin; and simultaneous provision of a second item of information, which is different from the first item of information, by the autostereoscopic 3D display such that this second item of information can be detected from a second seat in the passenger cabin.

A display device for presenting information by means of an autostereoscopic 3D display in a passenger cabin of an aircraft or spacecraft is also provided, comprising an autostereoscopic 3D display which is arranged in a predetermined portion of the passenger cabin, the autostereoscopic 3D display being configured to provide a first item of information such that the first item of information can be detected from a first seat in the passenger cabin and the autostereoscopic 3D display being configured to simultaneously provide a second item of information, which is different from the first item of information, such that the second item of information can be detected from a second seat in the passenger cabin.

The idea addressed by the present invention is to use an autostereoscopic 3D display in the passenger cabin in order to simultaneously provide on the autostereoscopic 3D display different information for different viewing directions or viewing angles. As a result, it is possible to realise a VOD system for a plurality of seats using only one display device. Compared to known VOD systems, a significant reduction in weight of the entire IFE system and thus of the aircraft or spacecraft is achieved by dispensing with the displays which are allocated to each individual passenger and are integrated into the passenger seats.

Advantageous configurations and improvements of the method and of the display device are provided in the sub-claims.

According to a preferred embodiment of the method, when the first item of information is provided and when the second item of information is simultaneously provided, the first seat and the second seat are arranged in a common row. This means that it is advantageously possible to provide at least two different items of information in one row of seats.

According to a further preferred embodiment of the method, when the first item of information is provided and when the second item of information is simultaneously provided, the first seat and the second seat are arranged in different rows. This means that it is advantageously possible to provide at least two different items of information in different rows of seats.

According to a preferred embodiment of the method, said method comprises a step for the simultaneous provision of a third item of information which is different from the first and/or from the second item of information, said third item of information being provided by the autostereoscopic 3D display such that it can be detected from a third seat in the passenger cabin. The provision of the third item of information widens the possible field of use of the method.

According to a further preferred embodiment of the method, said method comprises a step for detecting an eye position of a passenger by at least one camera means, a viewing direction of the passenger onto the autostereoscopic 3D display being adapted subject to the passenger's eye position. This means that a greater viewing angle range is achieved for the individual seats, thereby enhancing the passengers' comfort.

According to a preferred embodiment of the display device, the autostereoscopic 3D display is configured for the simultaneous provision of a third item of information which is different from the first and/or second item of information such that the third item of information can be detected from a third seat in the passenger cabin. This measure widens the possible field of use of the display device.

According to a preferred embodiment of the display device, the autostereoscopic 3D display is inclined at a display means inclination angle to a supply channel of the passenger cabin, the display means inclination angle being configured such that it is particularly adjustable. The supply channel preferably runs parallel to the longitudinal axis of the aircraft or spacecraft or of the passenger cabin. Arranging the autostereoscopic 3D display at the display means inclination angle ensures a good visibility for the passengers of the autostereoscopic 3D display, thereby enhancing the passengers' comfort.

According to a preferred embodiment of the display device, the autostereoscopic 3D display is arranged at least in portions in a supply channel of the passenger cabin, thereby increasing the available space in the passenger cabin. This measure also enhances the passengers' comfort.

BRIEF DESCRIPTION OF THE DRAWINGS

In the following, the invention will be described in more detail on the basis of embodiments with reference to the accompanying schematic figures of the drawings, in which:

FIG. 4 is a plan view of a passenger cabin with a development of the display device according to FIG. 1.

DESCRIPTION OF EXEMPLARY EMBODIMENTS

Figure 1:
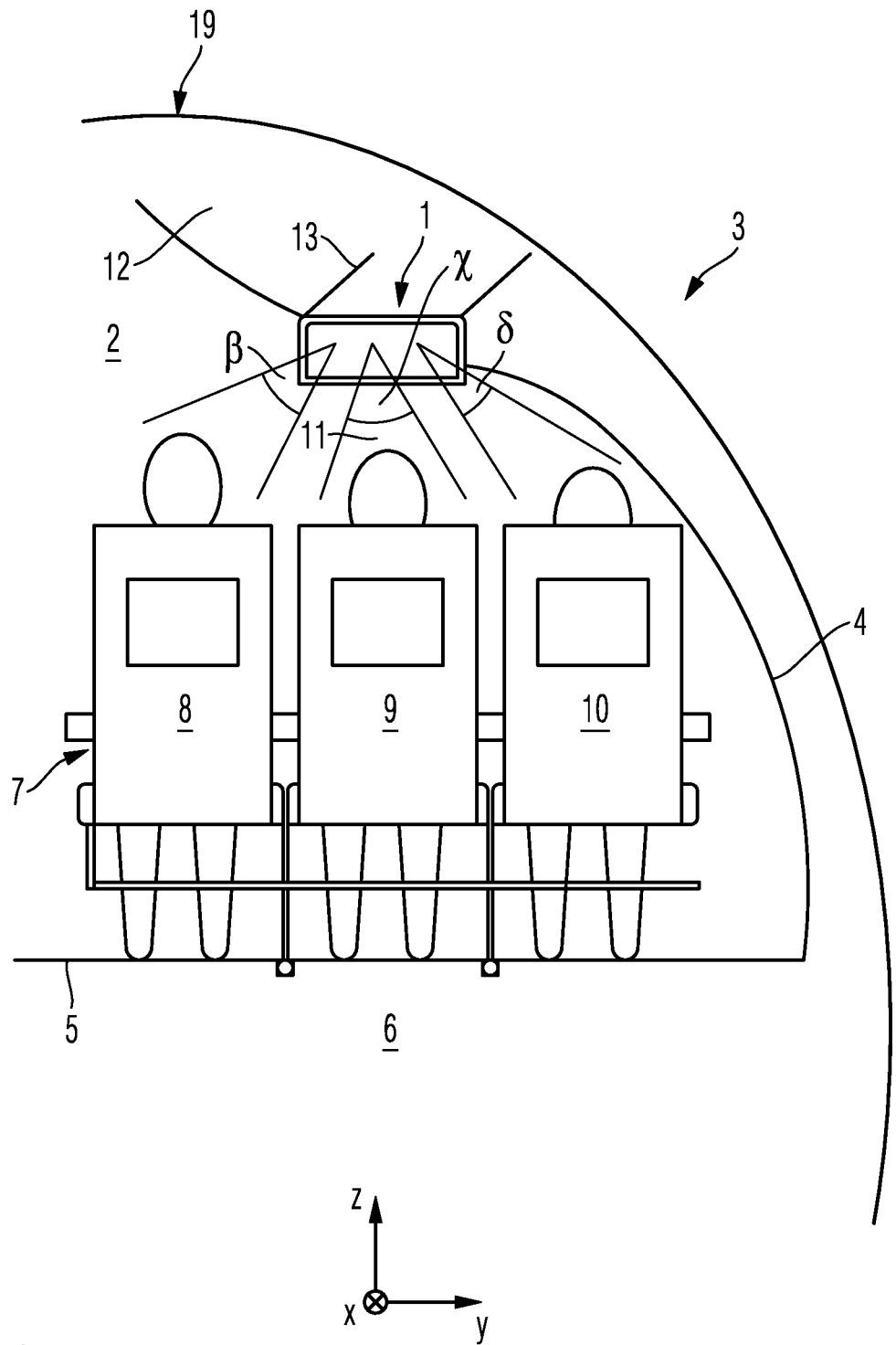
FIG. 1 is a front view of a preferred embodiment of a display device for presenting information in a passenger cabin of an aircraft or spacecraft.
Figure 2:
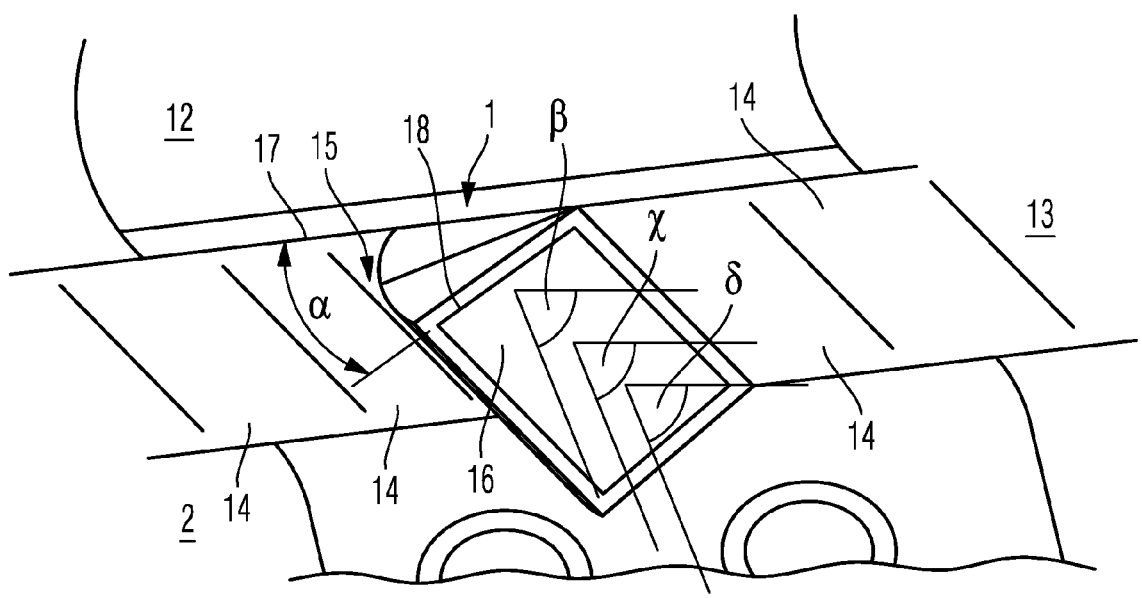
FIG. 2 is a perspective view of the preferred embodiment of the display device according to FIG. 1.

In the figures, the same reference numerals denote the same or functionally identical components, unless indicated otherwise.

FIGS. 1 to 4, to which reference will be made simultaneously in the following, illustrate preferred embodiments of a display device 1 for presenting information in a passenger cabin 2 of an aircraft or spacecraft 3. A plurality of display devices 1 is preferably provided in the passenger cabin 2. In particular, a so-called in-flight entertainment (IFE) system of the aircraft or spacecraft 3 has a plurality of display devices 1 of this type. In the following, reference will be made to only one display device 1. The passenger cabin 2 preferably has a side wall 4. The side wall 4 can be configured as the inner hull 4 of a fuselage airframe 19 of the aircraft or spacecraft 3. A floor 5 separates the passenger cabin 2 in an approximately horizontal manner from a hold 6 of the aircraft or spacecraft 3. A second passenger cabin can be provided instead of the hold 6. A coordinate system illustrates a longitudinal direction or longitudinal axis x, a transverse direction or transverse axis y and a vertical direction or vertical axis z of the fuselage airframe 19 or of the aircraft or spacecraft 3. The floor 5 preferably runs substantially in a plane spanned by the x-axis and by the y-axis. A plurality of rows with any number of seats is preferably arranged on the floor 5. For example, FIG. 1 shows one row 7 with seats 8, 9, 10. To supplement this, FIG. 4 is a schematic plan view of the passenger cabin 2 with a plurality of rows of seats.

Provided in an overhead area 11 of the row 7 of seats is preferably a stowage space 12, in particular a so-called hat rack 12. The hat rack 12 is used for stowing the passengers' hand luggage. Furthermore, a supply channel 13 is positioned in the overhead area 11, particularly on a lower side of the hat rack 12. The supply channel 13 runs in particular substantially in the longitudinal direction x. The supply channel 13 is used in particular to convey electric lines and/or data lines in the passenger cabin 2. The supply channel 13 is preferably covered relative to the passenger cabin 2 by cover panels 14 such that it cannot be seen from the passenger cabin 2. Arranged in a predetermined portion 15 of the passenger cabin 2 is a display means 16 of the display device 1. The predetermined portion 15 is preferably provided in the overhead area 11. In particular, the predetermined portion 15 is a portion of the supply channel 13, in particular of a cover panel 14. The display means 16 is preferably arranged at least in portions in the supply channel 13. In particular, the display means 16 or a housing of the display means 16 is integrated into a cover panel 14 which covers the supply channel 13. In this configuration of the display device 1, said display device 1 has in particular the corresponding cover panel 14.

Alternatively, the predetermined portion 15 can be any suitable portion of the passenger cabin 2. In particular, the predetermined portion 15 can be provided on a wall or surface, running vertically or in any oblique manner, of the passenger cabin 2. The display device 16 is then called in particular a so-called "wall mounted display". For example, the predetermined portion 15 can be provided on a so-called zone divider, in particular on a vertically running portion thereof, such as a dividing wall, a kitchen module or a toilet module of the passenger cabin 2.

Figure 3:
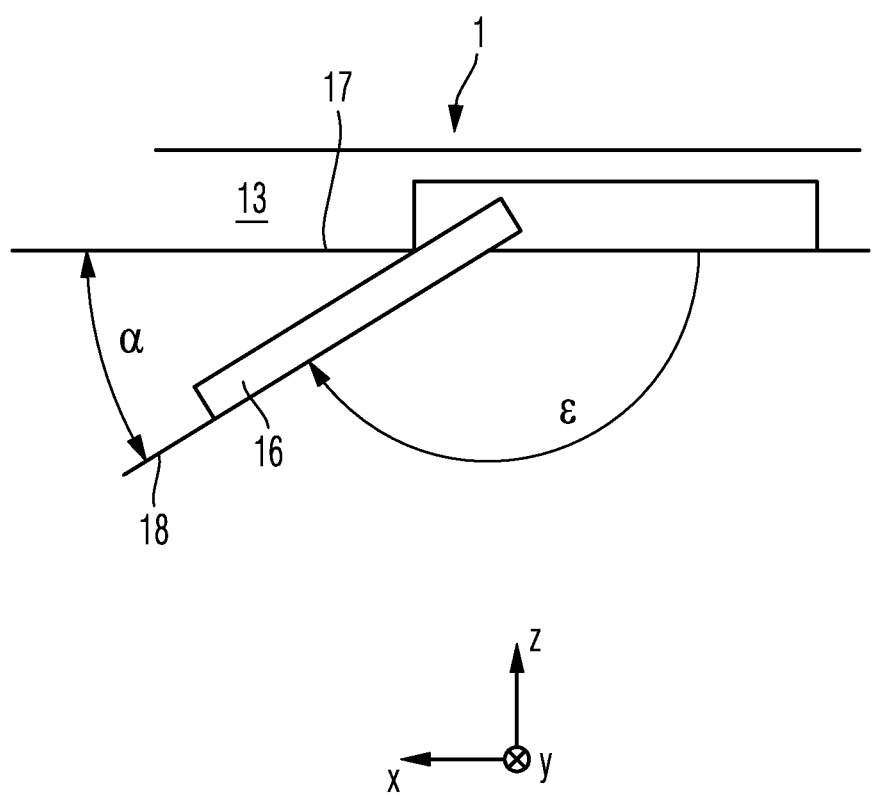
FIG. 3 is a side view of a preferred configuration of the display device according to FIG. 1.

An angle of inclination α of the display means 16 is preferably configured to be adjustable. For this purpose, the display device 1 can have an inclination angle adjusting means. In particular, the display means 16 can be inclined towards or away from the passengers. The display means inclination angle α is particularly spanned by a side edge 17 of the supply channel 13, which side edge 17 runs substantially parallel to the longitudinal direction x, and by a side edge 18 of the display means 16. As illustrated in FIG. 3, the display means 16 can be configured as a so-called retractable display. In this configuration, the display means 16 can be swivelled from a retracted state by an aperture angle ε into an extended state. The display means 16 is preferably swivelled away forwards by the passenger. The sum of the display means inclination angle α and of the aperture angle ε is preferably 180°. The display means 16 is preferably configured as a so-called overhead retractable display. The display means inclination angle α can also be fixedly set, i.e. it can be unchangeable. The display means 16 is preferably configured as an autostereoscopic 3D display 16, in particular as an autostereoscopic multi-user display 16, called display 16 in the following. In addition to the display 16, the display device 1 preferably has the corresponding cover panel 14, into which the display 16, in particular a housing of the display 16, is integrated.

The display device 1 preferably has a lens or strip matrix which is connected upstream of the display 16. The lens or strip matrix can be an integral part of the display 16. The individual pixels of the display 16 are deflected in different directions, particularly in the transverse direction y and/or in the vertical direction z by the lens or strip matrix. The autostereoscopic 3D display technology makes it possible in particular for different images to be presented for at least three different viewing directions or viewing angles. In the present context, the terms "viewing direction", "field of view" or "viewing angle" are understood as meaning a spatial area in front of the display in which an item of information, presented by the display 16, can be seen by a passenger. The spatial area can be in particular cylindrical, conical or in the form of a truncated cone. The passenger can only detect the item of information which is associated with a corresponding field of view when he, in particular his visual field is in the field of view. The provision of different images is particularly advantageous, since one row 7 of seats generally has at least three seats 8, 9, 10. The display 16 can emit two images recorded from different viewing angles such that they impact precisely on the respective eye of the passenger for a specific viewing direction and a specific viewing distance. However, in the present case, the 3D technology of the display 16 is not used to transmit the same image content from different viewing directions to different zones, but to transmit completely different image contents which can be associated with the individual seats 8, 9, 10. The technology of the display 16 operates similarly to that of a so-called flip image. The transmission of three-dimensional image contents is also possible with a suitable configuration of the display 16.

The display 16 is preferably configured to present a first item of information such that this can only be detected from a first position in the passenger cabin 2, in particular from a first seat, for example seat 8. In particular, the first item of information can only be perceived on the display 16 from a first viewing direction or from a first viewing angle $\beta$. The first viewing direction $\beta$ is associated, for example, with the first seat 8 of the row 7. The display 16 is also preferably configured to present at the same time as the first item of information a second item of information which is different from the first item of information such that this second item of information can only be detected from a second position in the passenger cabin 2, in particular from a second seat, for example from seat 9. The first item of information preferably cannot be seen from the second seat 9. In particular, the second item of information can only be perceived on the display 16 from a second viewing direction or from a second viewing angle $\chi$. The second viewing direction $\chi$ is associated, for example, with the second seat 9 of the row 7. The display 16 is preferably configured such that it can present at the same time as the first and/or second items of information a third item of information which preferably differs from the first and/or second items of information and can only be detected from a third position in the passenger cabin, in particular from a third seat, for example from seat 10. The third item of information can preferably not be detected either from the first seat 8 or from the second seat 9. In particular, the third item of information can only be perceived on the display 16 from a third viewing direction or from a third viewing angle $\delta$. The third viewing direction $\delta$ is associated, for example, with the third seat 10 of the row 7. Examples of information which is provided and used include video information or image information so that the passengers would be able to simultaneously watch different IFE videos by means of one display device 1. Different information is understood as particularly also meaning the same items of information, particularly contentually identical items of information which, independently of one another, are made available to different passengers with different viewing directions onto the display 16. Thus, a so-called video on demand (VOD) system is realised by means of only one display 16. Each pixel is fixedly associated with a respective viewer by the lens matrix. Basically, any number of items of information can be provided, depending on the configuration of the display 16. The maximum number of viewers is restricted only by the resolution of the display 16 or by the required image quality. The items of information which are provided also include three-dimensional items of video information. The seats 8, 9, 10 supplied by the display device 1 are preferably all arranged in the same row 7. The individual pixels of the display 16 are particularly deflected in the transverse direction y by the lens or strip matrix when the supplied seats 8, 9, 10 are arranged in the common row 7. It is possible to dispense with a deflection in the vertical direction z. An individual display device 1 can be allocated to each seat in the passenger cabin. As an alternative or in addition, the display device 1 can be associated with a plurality of any rows of seats, in which case an additional deflection of the individual pixels of the display 16 in the vertical direction z may be necessary.

In a development of the display device 1, the seats 8, 9, 10 are arranged in any rows. In this development, one display device 1 can be allocated to a plurality of rows. FIG. 4 is a plan view of the passenger cabin 2. The aircraft or spacecraft 3 is configured, for example, as a so-called single aisle aircraft. In this aircraft, a centre passenger aisle 22 is provided between left-hand rows 20 of seats and right-hand rows 21 of seats. Of the right-hand rows of seats, the rows 7, 23, 24 for example have been provided with a reference numeral. The first item of information provided by the display device 1 can only be detected, for example, from the first seat 8 of row 23. The second item of information can only be detected, for example, from the second seat 9 of row 7. The third item of information can only be detected, for example, from the third seat 10 of row 24. In particular, the first viewing direction $\beta$ is associated with seat 8 of row 23, the second viewing direction $\chi$ is associated with seat 9 of row 7 and the third viewing direction $\delta$ is associated with seat 10 of row 24. The individual pixels of the display 16 are particularly deflected in the transverse direction y and in the vertical direction z by the lens or strip matrix when the supplied seats 8, 9, 10 are arranged in different rows 7, 23, 24 to allocate the corresponding items of information to seats 8, 9, 10. The items of information which are provided are allocated arbitrarily to any positions or seats in the passenger cabin 2. For example, the items of information can be allocated to seats in a common row and at the same time to further seats in different rows.

In a preferred configuration of the display device 1, the display 16 is configured in order to present n different items of information such that these items can be detected from n different positions in the passenger cabin 2. The n items of information can be detected on the display 16 from n different viewing directions. In this respect, a defined viewing direction or position in the passenger cabin is associated with each of the n items of information. n describes in particular a random number.

Figure 5:
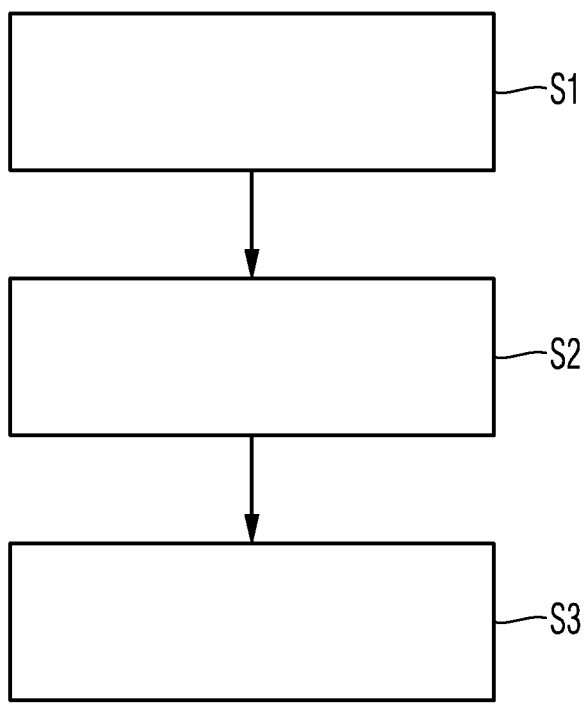
FIG. 5 is a flow chart of a preferred embodiment of a method for presenting information in a passenger cabin of an aircraft or spacecraft.

FIG. 5 illustrates a preferred embodiment of a method for presenting information by the display 16 in the passenger cabin 2 of the aircraft or spacecraft 3. In particular, the method comprises an initial step S1 for the provision of the display 16 in the specific portion 15 of the passenger cabin 2. In a further step S2, a first item of information is presented by the display 16 such that it can be detected from the first seat 8 in the passenger cabin 2. In particular, in step S2, the first item of information is provided such that it can only be perceived on the display 16 from a first viewing direction or from a first viewing angle $\beta$. In a further step S3, a second item of information which is different from the first item of information is simultaneously provided such that it can only be detected from the second seat 9 in the passenger cabin 2. In step S3, the second item of information is preferably provided such that it can only be perceived on the display 16 from a second viewing direction or from a second viewing angle $\chi$.

In an optional further step of the method which is not shown in FIG. 5, a third item of information which is different from the first and/or second items of information is provided at the same time as the first and/or second items of information such that it can only be detected from the third seat 10 in the passenger cabin 2. In this step, the third item of information is preferably provided such that it can only be perceived on the display 16 from a third viewing direction or from a third viewing angle δ. When the first item of information is provided, when the second item of information is simultaneously provided and when the third item of information is simultaneously provided, the first seat 8, the second seat 9 and the third seat 10 are preferably arranged in a common row 7. In an alternative configuration of the method, when the first item of information is provided, when the second item of information is simultaneously provided and when the third item of information is simultaneously provided, the first seat 8, the second seat 9 and the third seat 10 are preferably arranged in different rows 7, 23, 24.

In a development of the method, said method has any number n of steps. In these n steps, the display 16 presents n different items of information such that they can be detected from n different positions in the passenger cabin 2. The n items of information can be detected on the display 16 from n different viewing directions. In this respect, a defined viewing direction or position in the passenger cabin is associated with each of the n items of information. The n different items of information can either be allocated to n seats in a common row and/or to n seats in n different rows.

In a further development of the method, the method has a step for detecting an eye position of a passenger or for detecting a plurality of eye positions of several passengers by one or by a plurality of camera means, the corresponding viewing directions β, χ, δ of the passenger or passengers onto the display 16 being adapted subject to the eye position(s) of the passenger(s). For this purpose, the display device 1 has, for example, an adjusting means for the lens or strip matrix and a corresponding control means. The camera means can be integrated into the display means or can be provided in an appropriate position in the passenger cabin 2.

The display device 1 which has been described and the method which has been described make it possible to provide different items of information, in particular video information, in a targeted manner for individual passengers. Subject to the resolution of the display 16 and to the number of lenses or strips of the lens or strip matrix, it is possible to transmit either a 2D image or a 3D image to the respective seat 8, 9, 10. An optional enhancement of the display device 1 analogously to the development in the case of the autostereoscopic multi-user displays can be provided by incorporating cameras into the display device 1 which track the eye positions of the passengers and accordingly adapt the positioning of the lenses or strips in front of the display 16. This produces a greater viewing angle range for the individual seats. Compared to conventional VOD systems, the use of the display device 1 provides a significant weight advantage, because it is possible to dispense with so-called in-seat displays. Furthermore, compared to conventional in-seat displays, a greater screen diagonal of the display 16 is obtained, because an installation space restriction is not predetermined by the seat width, thereby enhancing the passengers' comfort. The absence of the in-seat displays means that the production of the seats is significantly simplified and reduced in cost. Every passenger can watch the presentation of video information in 3D without 3D glasses. This also enhances the passengers' comfort.

The materials, numerical information and dimensions which have been stated are to be understood as examples and have merely been provided to explain the embodiments and developments of the present invention.

Of course, it is also possible to use the invention in other fields, particularly in vehicle construction or in shipbuilding. In particular, the invention can also be used in the home entertainment sector.

LIST OF REFERENCE NUMERALS 1 display device
2 passenger cabin
3 aircraft or spacecraft
4 side wall
5 floor
6 hold
7 row of seats
8 seat
9 seat
10 seat
11 overhead area
12 stowage space
13 supply channel
14 cover panel
15 portion
16 display means
17 side edge
18 side edge
19 fuselage airframe
20 left-hand rows of seats
21 right-hand rows of seats
22 passenger aisle
23 row of seats
24 row of seats
α display means inclination angle
β viewing direction
χ viewing direction
δ viewing direction
ε aperture angle

The invention claimed is:

1. A display device for presenting information by an autostereoscopic 3D display in a passenger cabin of an aircraft or spacecraft, the display device comprising:
the autostereoscopic 3D display, a housing of which is integrated in a cover panel of a supply channel of the passenger cabin arranged in an overhead area of the passenger cabin, the autostereoscopic 3D display configured to provide a first item of information such that the first item of information can be detected from a first seat in the passenger cabin and the autostereoscopic 3D display configured to simultaneously provide a second item of information, which is different from the first item of information, such that the second item of information can be detected from a second seat in the passenger cabin;
wherein the first seat and the second seat are arranged in different rows; and
wherein the display device has a lens or strip matrix which is connected upstream of the display or is an integral part of the display, and individual pixels of the display are deflected in different directions, particularly in a transverse direction and in a vertical direction of the passenger cabin by the lens or strip matrix.

2. The display device according to claim 1, wherein the autostereoscopic 3D display is configured for simultaneous provision of a third item of information which is different from the first and/or second items of information such that the third item of information can be detected from a third seat in the passenger cabin.

3. The display device according to claim 1, wherein the autostereoscopic 3D display is inclined at an inclination angle to the supply channel of the passenger cabin, the inclination angle configured such that it is particularly adjustable.

4. The display device according to claim 1, wherein the display device is adapted such that an eye position of a passenger is detectable by at least one camera, wherein a viewing direction of the passenger onto the autostereoscopic 3D display is adaptable subject to the eye position of the passenger.

5. A passenger cabin for an aircraft or spacecraft comprising a display device according to claim 1.

6. An aircraft having a passenger cabin according to claim 5.

7. An aircraft or spacecraft having a display device according to claim 1.

* * * * *